US006535895B2

(12) United States Patent
Bonner et al.

(10) Patent No.: US 6,535,895 B2
(45) Date of Patent: Mar. 18, 2003

(54) TECHNIQUE TO AVOID PROCESSING WELL CLUSTERED LOB'S DURING REORGANIZATION OF A LOB TABLE SPACE

(75) Inventors: Charles Roy Bonner, San Jose, CA (US); Robert William Lyle, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/322,287

(22) Filed: May 28, 1999

(65) Prior Publication Data

US 2002/0065792 A1 May 30, 2002

Related U.S. Application Data

(60) Provisional application No. 60/101,729, filed on Sep. 24, 1998.

(51) Int. Cl.⁷ .............................................. G06F 17/30
(52) U.S. Cl. ..................... 707/205; 707/202; 711/170
(58) Field of Search .......................... 707/103 R, 206, 707/205, 202; 711/170

(56) References Cited

U.S. PATENT DOCUMENTS

| | | | | | |
|---|---|---|---|---|---|
| 5,222,235 A | * | 6/1993 | Hintz et al. | ..................... | 703/22 |
| 5,517,641 A | * | 5/1996 | Barry et al. | ................. | 707/101 |
| 5,721,915 A | * | 2/1998 | Sockut et al. | ................ | 707/200 |
| 5,732,402 A | * | 3/1998 | Lehman | ....................... | 707/100 |
| 5,758,357 A | * | 5/1998 | Barry et al. | ................. | 707/202 |
| 5,778,392 A | * | 7/1998 | Stockman et al. | .......... | 707/205 |
| 5,930,828 A | * | 7/1999 | Jensen et al. | ................ | 711/170 |
| 5,999,943 A | * | 12/1999 | Nori et al. | ..................... | 707/104 |
| 6,061,690 A | * | 5/2000 | Nori et al. | ..................... | 707/103 |
| 6,070,170 A | * | 5/2000 | Friske et al. | ................. | 707/200 |
| 6,209,000 B1 | * | 3/2001 | Klein et al. | ................. | 707/203 |
| 6,243,718 B1 | * | 6/2001 | Klein et al. | ................. | 707/203 |
| 6,343,286 B1 | * | 1/2002 | Lee et al. | ....................... | 707/3 |

OTHER PUBLICATIONS

Oracle Corporation, "Oracle Enterprise Manager Performance Monitoring User's Guide", Release 1.4.0, Jul. 1997, Chapter 10 pp. 1–23.*
Craig Shallahamer, "Avoiding A Database Reorganization, Understanding, Detecting and Eliminating Harmful Database Fragmentation", Oracle Services—System Performance Group, Nov. 2, 1994, pp. 1–12.*
Hauser et al., "The Basics of DB2 Version 3 COPY", Enterprise Systems Journal, V10, n7, Jul. 1995, pp. 42–46.*
Price et al., "DB2/2 catches up", DBMS, V8, n12, Nov. 1995, pp. 98–102.*

* cited by examiner

Primary Examiner—Jean R. Homere
Assistant Examiner—Knanh Pham
(74) Attorney, Agent, or Firm—Sughrue Mion, PLLC

(57) ABSTRACT

A method, apparatus, and article of manufacture for a computer implemented reorganization system. A table space is reorganized in a database stored on a data storage device connected to a computer. When inserting or updating a LOB into a portion of the table space, a space map is marked to indicate whether the LOB was well inserted. When reorganizing the table space, when the space map indicates that a LOB was well inserted, reorganization of the portion of the table space in which the LOB was well inserted is avoided.

26 Claims, 6 Drawing Sheets

TECHNIQUE TO AVOID PROCESSING WELL CLUSTERED LOB'S DURING REORGANIZATION OF A LOB TABLE SPACE

PROVISIONAL APPLICATION

This application claims the benefit of U.S. Provisional Application No. 60/101,729, entitled "IMPROVED DATABASE SYSTEM," filed on Sep. 24, 1998, by Charles R. Bonner et al., which is incorporated by reference herein.

CROSS-REFERENCE TO THE RELATED APPLICATIONS

This application is related to the following co-pending and commonly-assigned patent applications:

application Ser. No. 09/322,312, entitled "USING AN EPOCH NUMBER TO OPTIMIZE ACCESS WITH ROWID COLUMNS AND DIRECT ROW ACCESS," filed on same date herewith, by Robert W. Lyle et al.;

application Ser. No. 09/321,675, entitled "A FAST TECHNIQUE FOR RECOVERING AN INDEX ON AN AUXILIARY TABLE," filed on same date herewith, by Robert W. Lyle et al.;

application Ser. No. 09/322,292. entitled "STORING AN UNCOMPRESSED DATA LENGTH IN A LOB MAP TO SPEED SUBSTRING ACCESS WITHIN A LOB VALUE," filed on same date herewith, by Robert W. Lyle et al.;

application Ser. No. 09/322,317, entitled "AN OPTIMIZED TECHNIQUE FOR PREFETCHING LOB TABLE SPACE PAGES," filed on same date herewith, by Charles R. Bonner et al.;

application Ser. No. 09/322,286, entitled "A TECHNIQUE FOR CREATING A UNIQUE QUASI-RANDOM ROW IDENTIFIER," filed on same date herewith, by Robert W. Lyle et al.;

application Ser. No. 09/322,698, entitled "A TECHNIQUE FOR DETERMINING AN AGE OF AN OLDEST READING TRANSACTION WITHIN A DATABASE OBJECT," filed on same date herewith, by Robert W. Lyle et al.;

application Ser. No. 09/372,315, entitled "AN EFFICIENT TECHNIQUE TO DEFER LARGE OBJECT ACCESS WITH INTERMEDIATE RESULTS," filed on same date herewith, by Christine M. Lee et al.; and application Ser. No. 09/322,316, entitled "A TECHNIQUE FOR INPLACE REORGANIZATION OF A LOB TABLE SPACE," filed on same date herewith, by Charles R. Bonner et al.;

each of which is incorporated by reference herein.

BACKGROUND OF THE INVENTION

1. Field of the Invention

This invention relates in general to computer-implemented database systems, and, in particular, to a technique for efficient reorganization of a LOB table space that avoids processing well clustered LOBs.

2. Description of Related Art

Databases are computerized information storage and retrieval systems. A Relational Database Management System (RDBMS) is a database management system (DBMS) which uses relational techniques for storing and retrieving data. Relational databases are organized into tables which consist of rows and columns of data. The rows are formally called tuples or records. A database will typically have many tables and each table will typically have multiple tuples and multiple columns. Tables are assigned to table spaces. A table space is associated with direct access storage devices (DASD), and, thus, tables, are stored on DASD, such as magnetic or optical disk drives for semi-permanent storage.

A table space can be a system managed space (e.g., an operating system file system) or a database managed space. Each table space is physically divided into equal units called pages or pages. Each page, which may contain 4 K bytes, holds one or more rows of a table and is the unit of input/output (I/O). The rows of a table are physically stored as records on a page.

Traditionally, a RDBMS stored simple data, such as numeric and text data. In a traditional RDBMS, the underlying storage management has been optimized for simple data. More specifically, the size of a record is limited by the size of a page, which is a fixed number (e.g., 4K) defined by a computer developer. This restriction in turn poses a limitation on the length of columns of a table. To alleviate such a restriction, most computer developers today support a new built-in data type for storing large objects (LOBs). Large objects, such as image data, typically take up a great deal of storage space. A record is always fully contained within a page and is limited by page size. However, as users move towards working with image data and other large data objects, storing data in conventional records becomes difficult.

An index is an ordered set of references to the records or rows in a database file or table. The index is used to access each record in the file using a key (i.e., one of the fields of the record or attributes of the row). However, building an index for a large file can take a considerable amount of elapsed time. The process involves scanning all records in the file, extracting a key value and record identifier (rid) value from each of the records, sorting all of the key/rid values, and then building the index from the sorted key/rid values. Typically, the scanning, sorting, and index build steps are performed serially, which can be time consuming in the case of a large database file. When a RDBMS stores LOBs, an index is typically used to access the LOBs efficiently.

As data is added to and deleted from tables in a table space, the data may not be well organized. To resolve this, conventional systems enable a table space to be reorganized so that the data in the table space is better organized. For example, data may be reorganized sequentially. Some conventional systems perform reorganization of data by unloading the data out of the table space and then loading the data back into the table space so that the data is organized better. Current reorganization strategies do not consider the organization state of a table space or an index space, and, generally, reorganize the entire table and index space. Reorganizing the entire table and index space when only a small percentage of data is disorganized is an unnecessary cost and increases elapsed time for reorganizing data. This is especially true when the data consists of LOBs.

Therefore, there is a need in the art for an improved technique for efficient reorganization of a LOB table space that avoids processing well clustered LOBs.

SUMMARY OF THE INVENTION

To overcome the limitations in the prior art described above, and to overcome other limitations that will become apparent upon reading and understanding the present specification, the present invention discloses a method, apparatus, and article of manufacture for a computer implemented reorganization system.

In accordance with the present invention, a table space is reorganized in a database stored on a data storage device connected to a computer. When inserting or updating a LOB into a portion of the table space, a space map is marked to indicate whether the LOB was well inserted. When reorganizing the table space, when the space map indicates that a LOB was well inserted, reorganization of the portion of the table space in which the LOB was well inserted is avoided.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and which is shown by way of illustration a specific embodiment in which the invention may be practiced. It is to be understood that other embodiments may be utilized as structural changes may be made without departing from the scope of the present invention.

Hardware Environment

Figure 1:
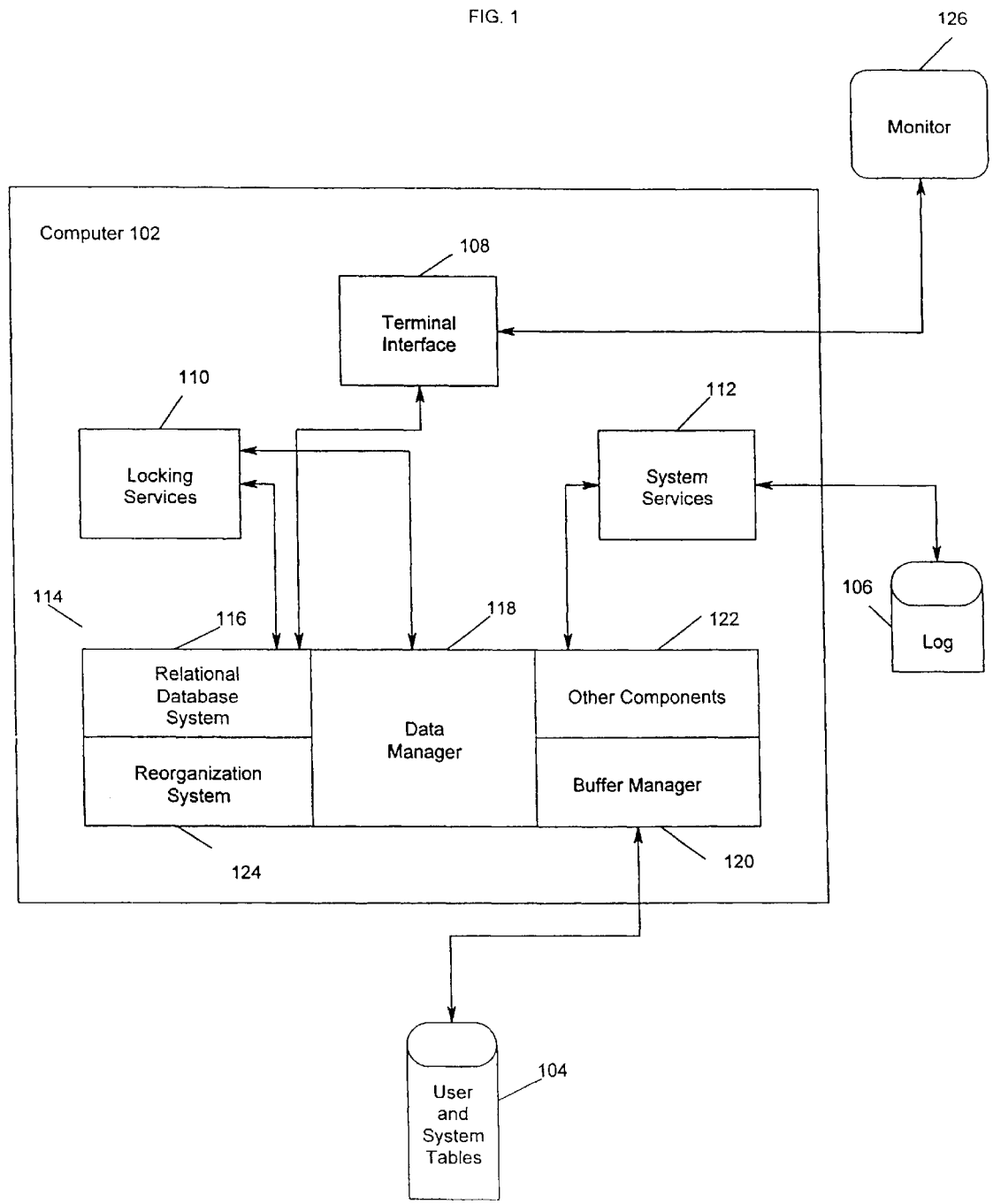
FIG. 1 illustrates an exemplary computer hardware environment that could be used in accordance with the present invention.

FIG. 1 illustrates an exemplary computer hardware environment that could be used in accordance with the present invention. In the exemplary environment, a computer system 102 is comprised of one or more processors connected to one or more data storage devices 104 and 106 that store one or more relational databases, such as a fixed or hard disk drive, a floppy disk drive, a CDROM drive, a tape drive, or other device.

Operators of the computer system 102 use a standard operator interface 108, such as IMS/DB/DC®, CICS®, TSO®, ODBC® or other similar interface, to transmit electrical signals to and from the computer system 102 that represent commands for performing various search and retrieval functions, termed queries, against the databases. In the present invention, these queries conform to the Structured Query Language (SQL) standard, and invoke functions performed by Relational DataBase Management System (RDBMS) software.

The SQL interface has evolved into a standard language for RDBMS software and has been adopted as such by both the American National Standards Institute (ANSI) and the International Standards Organization (ISO). The SQL interface allows users to formulate relational operations on the tables either interactively, in batch files, or embedded in host languages, such as C and COBOL. SQL allows the user to manipulate the data.

In the preferred embodiment of the present invention, the RDBMS software comprises the DB2® product offered by IBM for the OS/390® operating systems. Those skilled in the art will recognize, however, that the present invention has application program to any RDBMS software, whether or not the RDBMS software uses SQL.

As illustrated in FIG. 1, the DB2® system for the OS/390® operating system includes three major components: the Internal Resource Lock Manager (IRLM) 110, the Systems Services module 112, and the Database Services module 114. The IRLM 110 handles locking services for the DB2® system, which treats data as a shared resource, thereby allowing any number of users to access the same data simultaneously. Thus concurrency control is required to isolate users and to maintain data integrity. The Systems Services module 112 controls the overall DB2® execution environment, including managing log data sets 106, gathering statistics, handling startup and shutdown, and providing management support.

At the center of the DB2® system is the Database Services module 114. The Database Services module 114 contains several submodules, including the Relational Database System (RDS) 116, the Data Manager 118, the Buffer Manager 120, the Reorganization System 124, and other components 122 such as an SQL compiler/interpreter. These submodules support the functions of the SQL language, i.e. definition, access control, interpretation, compilation, database retrieval, and update of user and system data. The reorganization system 124 works in conjunction with the other submodules to reorganize data.

The present invention is generally implemented using SQL statements executed under the control of the Database Services module 114. The Database Services module 114 retrieves or receives the SQL statements, wherein the SQL statements are generally stored in a text file on the data storage devices 104 and 106 or are interactively entered into the computer system 102 by an operator sitting at a monitor 126 via operator interface 108. The Database Services module 114 then derives or synthesizes instructions from the SQL statements for execution by the computer system 102.

Generally, the RDBMS software, the SQL statements, and the instructions derived therefrom, are all tangibly embodied in a computer-readable medium, e.g. one or more of the data storage devices 104 and 106. Moreover, the RDBMS software, the SQL statements, and the instructions derived therefrom, are all comprised of instructions which, when read and executed by the computer system 102, causes the computer system 102 to perform the steps necessary to implement and/or use the present invention. Under control of an operating system, the RDBMS software, the SQL statements, and the instructions derived therefrom, may be loaded from the data storage devices 104 and 106 into a memory of the computer system 102 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Efficient Reorganization of a LOB Table Space

The reorganization system 124 of the present invention provides a technique for efficient reorganization of a LOB table space that avoids processing well clustered LOBs. Well clustered (i.e., well inserted) LOBs are large objects that are already organized well. In particular, the term "chunking" is used to refer to maintaining LOB pages in contiguous groups of 16 LOB pages, which form blocks, and allocated LOBs to these blocks. A LOB is well inserted when the LOB is allocated to as few blocks as possible. For example, a LOB that is allocated to 160 LOB pages is well inserted if the LOB is stored in 10 blocks. Similarly, a LOB that is allocated to 23 LOB pages is well inserted if the LOB is stored in 2 blocks. The "chunking" technique is described in further detail in the above-identified, cross-referenced application entitled "A TECHNIQUE FOR INPLACE REORGANIZATION OF A LOB TABLE SPACE".

In particular, at the time a LOB is being inserted into a table space or updated in the table space, the reorganization system 124 sets an organization state of each LOB. The organization state is modified when the LOB is updated. If the updated LOB page allocations for the LOB can be considered as perfectly chunked (i.e., the LOB is well organized and stored in as few blocks as possible), the organization state for the LOB indicates that the LOB need not be considered for reorganization. Thus, during reorganization, only LOB pages belonging to LOBs whose organization states indicate that they need rechunking or reorganization have to be accessed. Rechunking refers to reallocating the LOB to contiguous LOB pages within as few blocks as possible. Additionally, after reorganization, the organization state of each LOB is saved, and the well inserted LOBs are not considered for reorganization again.

Figure 2:
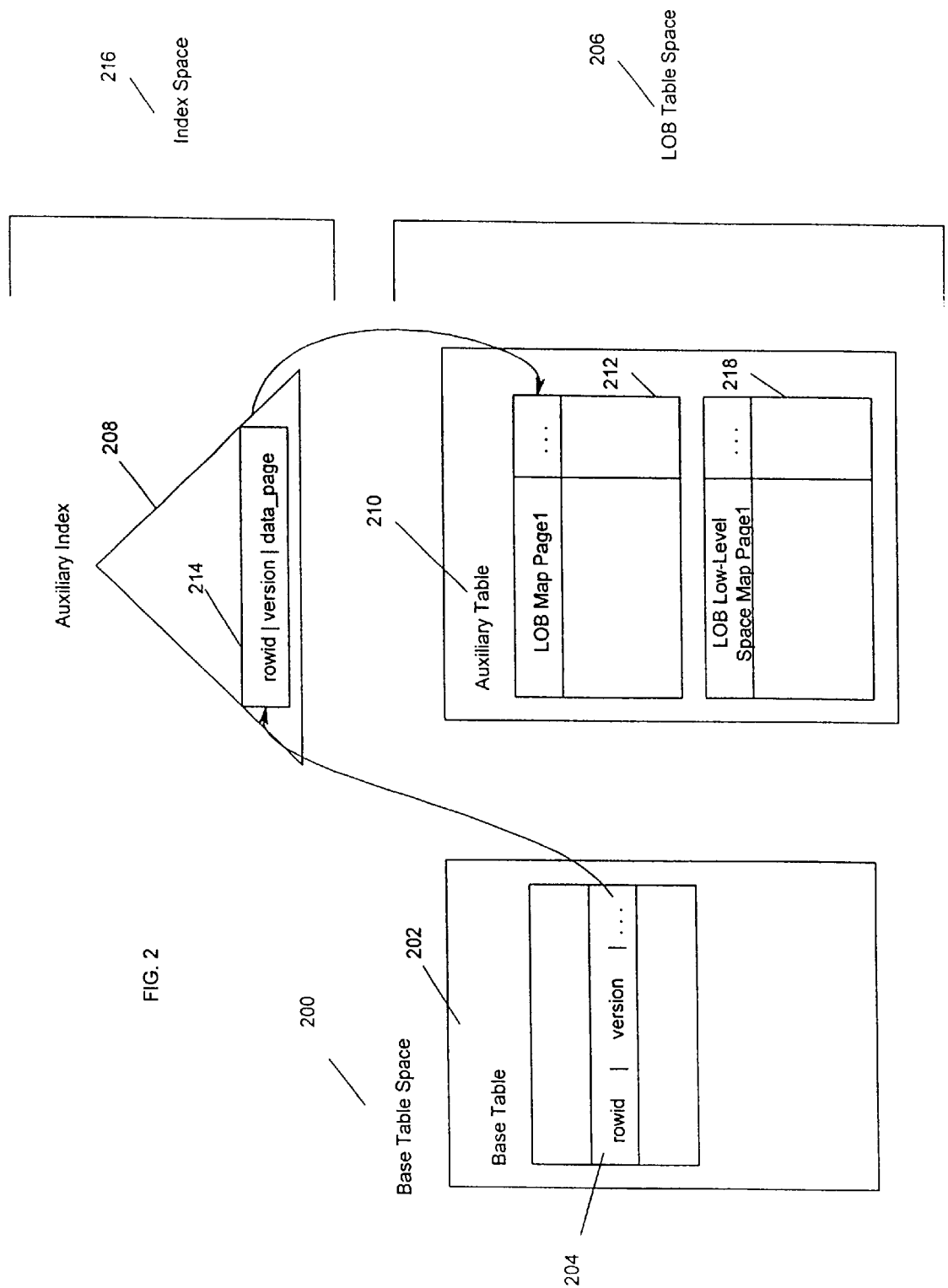
FIG. 2 is a block diagram illustrating an exemplary base table space and LOB table space.

FIG. 2 is a block diagram illustrating an exemplary base table space 200 and LOB table space 206. A base table space 200 contains a base table 202. The base table 202 is a table definition that logically contains rows and columns of data. For example, row 204 contains columns for a row identifier ("rowid"), a version number ("version), and other columns (indicated with the ellipses). The reorganization system 124 stores LOB values in LOB columns outside of the base table 202. The LOB columns may be stored outside of the base table 202, but they still are logically part of the base table 202. The LOB values are stored in a LOB table space 206 that is completely separate from the base table space 200 in which the base table 202 is defined.

The LOB table space 206 contains an auxiliary table 210. The reorganization system 124 requires that users define an auxiliary table 210 within the LOB table space 206 to contain the actual LOB values. The auxiliary index 208 is created on the auxiliary table 210 in index space 216. The data manager 118 has been extended to find LOB values. In particular, the data manager 118 uses the auxiliary index 208 to quickly find the LOB values for a specific row. In particular, the auxiliary index contains keys 214, which indicate the first LOB map page, such as LOB Map Page1 212. The first LOB map page acts as a directory to the LOB map and LOB pages of a LOB and assists with accessing the LOB data. In addition to LOB Map pages, such as LOB Map Page1 212, the auxiliary table 210 contains LOB low-level space map pages, such as LOB Low-Level Space Map Page1 218. LOB low-level space map pages assist in allocating and deallocating LOB pages. A high-level space map identifies the low-level space map pages.

Figure 3:
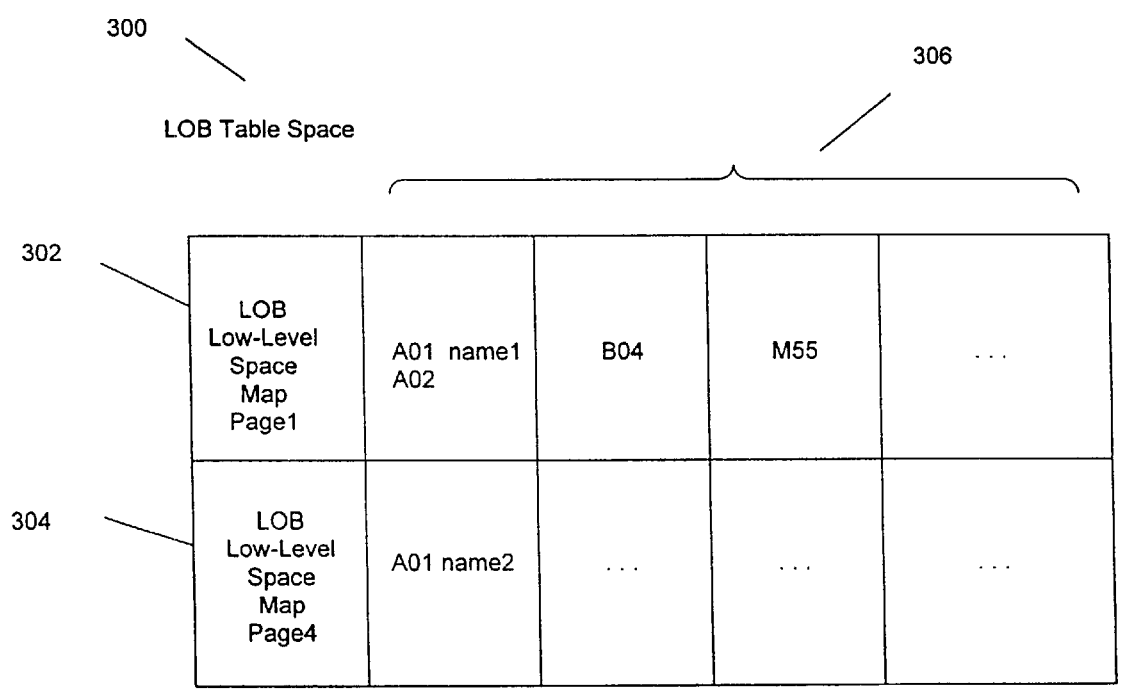
FIG. 3 is a block diagram illustrating an exemplary table space containing LOB low-level space map pages and pages.

FIG. 3 is a block diagram illustrating an exemplary table space containing LOB low-level space map pages and LOB pages. A table space 300 contains a number of LOB low-level space map pages 302, 304. Each LOB low-level space map page 302, 304 covers a number of LOB pages 306. Each LOB page is allocated to one LOB, even if the LOB uses only a portion of the LOB page. For example, one LOB may be stored on 17 and a half LOB pages, but the LOB page that is half used is not allocated to any other LOB. Each LOB low-level space map page 302, 304 covers a fixed range of LOB pages 306. A LOB low-level space map page 302, 304 identifies the LOB pages 306 that have not yet been allocated to a LOB. When inserting a LOB, one or more LOB low-level space map pages 302, 304 are accessed to find LOB pages that may be allocated to the LOB. All LOB pages within a single table space have the same page size. A page may contain, for example, 4096 bytes.

Figure 4:
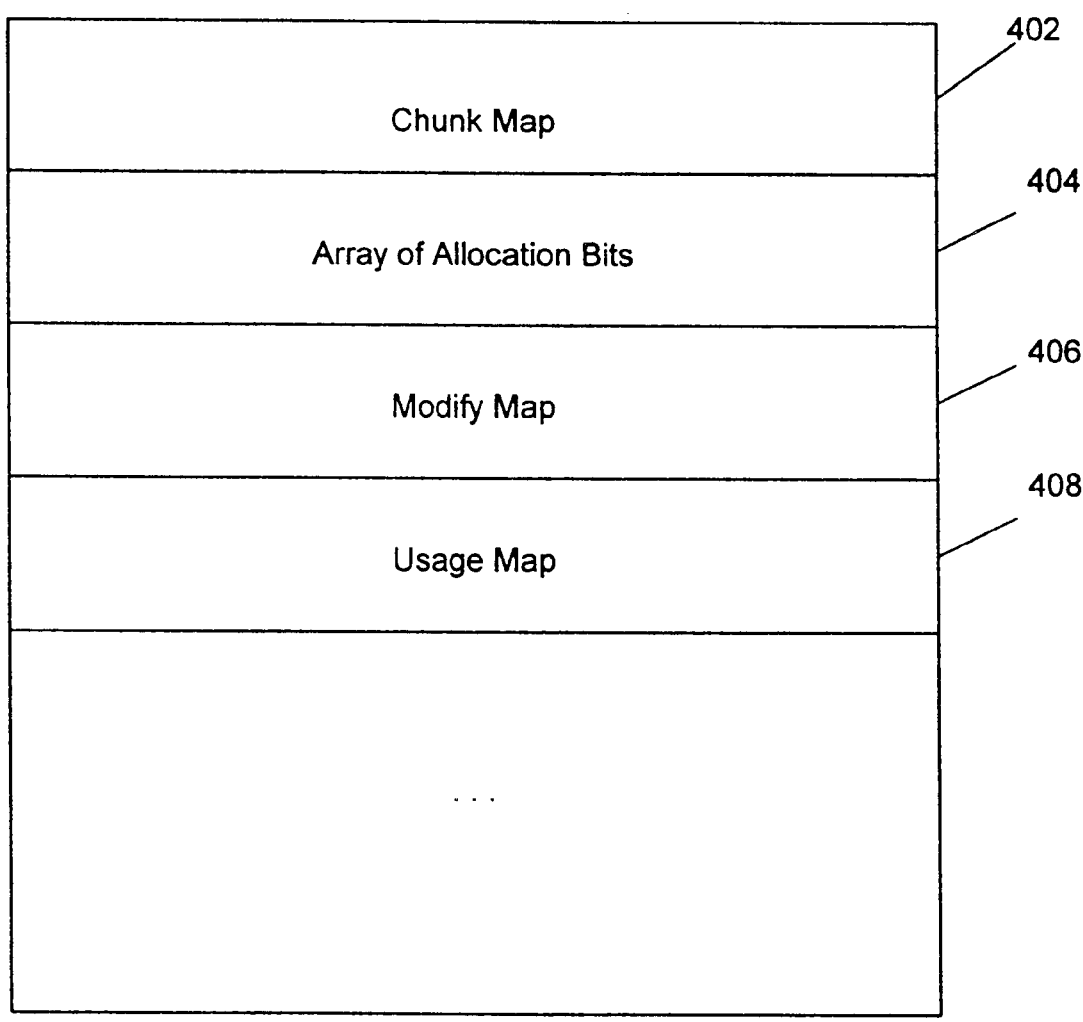
FIG. 4 is a block diagram illustrating an exemplary LOB low-level space map page.

FIG. 4 is a block diagram illustrating an exemplary LOB low-level space map page 400. LOB low-level space map page 400 contains a chunk map 402, an array of allocation bits 404, a modify map 406, a usage map 408, and other information, as indicated by the ellipses. The chunk map 402 is a series of two bit entries that indicate for each chunk whether that chunk is empty, partially used, fully used, or allocated to a single LOB. The array of allocation bits 404 has two bit entries that indicate whether each LOB page covered by the LOB low-level space map page 400 is unallocated, has been deallocated, is allocated, or is allocated and is the first page allocated to a LOB. The modification map 406 indicates for each page covered by the LOB low-level space map page 400 whether that page has been modified since the last time the page was copied. The usage map 408 has an entry for each page covered by the LOB low-level space map page 400. For each page, the usage map 408 provides a row identifier and version number to uniquely identify a LOB to which that page is allocated. Moreover, the usage map 408 indicates, for each page that is the first page allocated to a LOB, whether the LOB is well inserted or "perfectly chunked" (i.e., an organization state).

The organization state is a bit setting stored in the usage map for each LOB in the set of LOB pages referenced by the usage map. The usage maps are stored in the LOB low-level space map page and contain information about the LOB. There is one usage map entry for every LOB page in the LOB. The organization state is only maintained in the usage map for the first LOB page of the LOB and applies to the entire LOB.

When a LOB is being inserted into a table space or is being updated within a table space, the reorganization system 124 maintains a list of the LOB pages that are allocated to the LOB as they occur. Once the LOB is allocated to one or more LOB pages, the reorganization system determines the organization state of a LOB based on the LOB pages allocated to the LOB. If the reorganization system 124 determines that a LOB is perfectly chunked after LOB pages have been allocated to that LOB, the reorganization system 124 sets the organization state for the LOB to indicate that LOB is well inserted. In fact, for updating a LOB, the reorganization system 124 may delete the LOB from the table space and then insert the LOB into the table space while attempting to ensure that the LOB is well inserted.

Figure 5:
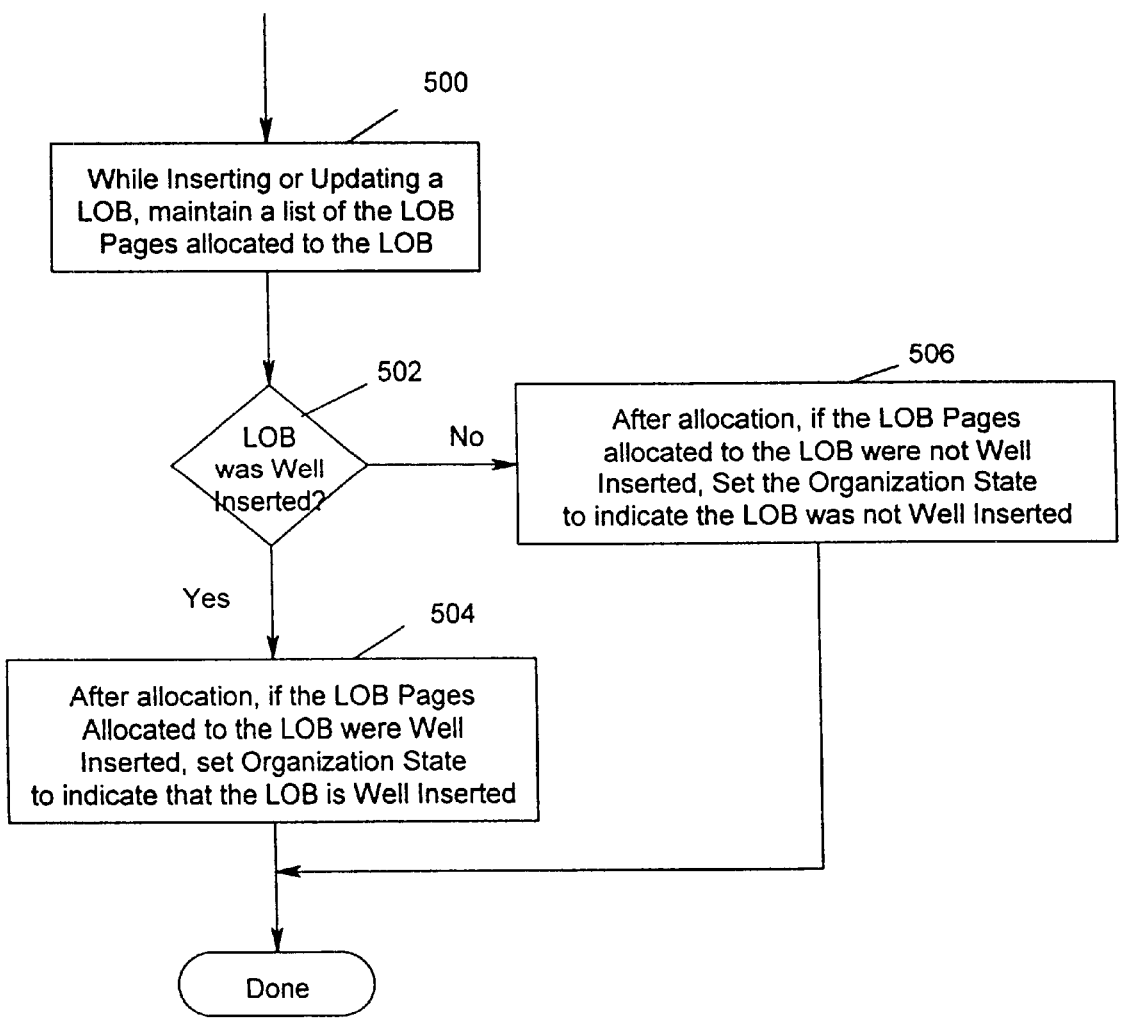
FIG. 5 is a flow diagram illustrating the steps performed by the reorganization system to insert or update a LOB.

FIG. 5 is a flow diagram illustrating the steps performed by the reorganization system 124 to insert or update a LOB. In Block 500, the reorganization system 124 maintains a list of the LOB pages allocated to a LOB during insertion or updating of the LOB. After the allocation of LOB pages to the LOB, in Block 502, the reorganization system 124 determines whether the LOB was well inserted during the insertion or update. In Block 504, if the LOB was well inserted, the reorganization system 124 sets the organization state of the LOB, which is a bit in a space map page that indicates that the LOB was well inserted. Note that, as a LOB is being inserted or updated, the insertion and update are tracked. Then, the information obtained from tracking the insertion or update is used to determine whether the LOB was well inserted. In Block 506, if the LOB was not well inserted, the reorganization system 124 sets the organization state of the LOB to indicate that the LOB was not well inserted.

After LOBs are stored in a table space, if the table space is to be reorganized, the reorganization system 124 will look at the usage map in each LOB space map to identify the organization state of a LOB. Additionally, the reorganization system 124 will look at the LOB space map to find the first LOB page allocated to the LOB. If the organization state indicates that the LOB is well inserted, the reorganization system 124 avoids reorganizing the LOB. However, if the LOB is not well inserted, the reorganization system 124 reorganizes the LOB. For example, if a LOB was allocated to 17 individual LOB pages, the reorganization system 124 will attempt to reorganize the LOB by allocating the LOB to one block containing 16 LOB pages and to an additional LOB page. Then, the reorganization system 124 updates the index to the LOB and updates the organization state for the LOB in the LOB space map.

Figure 6:
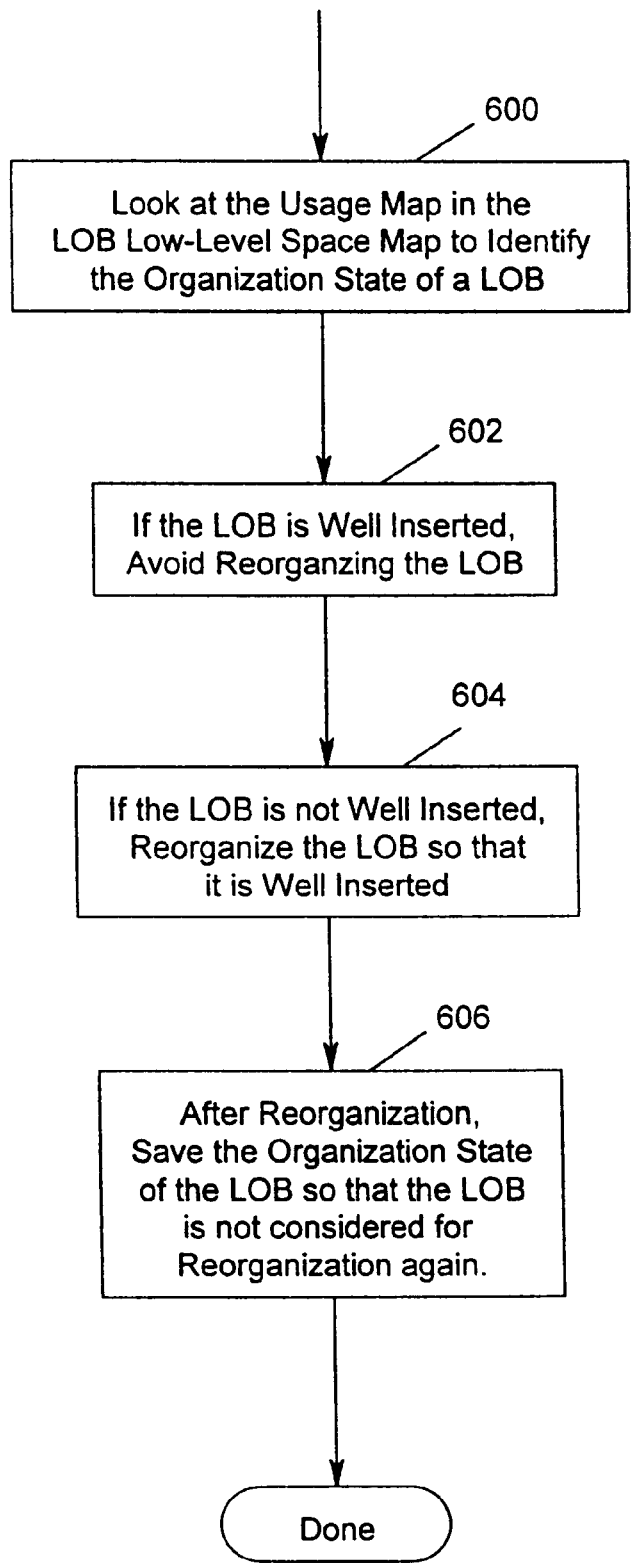
FIG. 6 is a flow diagram illustrating the steps performed by the reorganization system to reorganize a LOB table space.

FIG. 6 is a flow diagram illustrating the steps performed by the reorganization system 124 to reorganize a LOB table space. In Block 600, the reorganization system 124 looks at the usage map in the LOB low-level space map to identify the organization state of a LOB. In Block 602, if the organization state indicates that the LOB was well inserted, the reorganization system 124 avoids reorganizing the LOB. In Block 604, if the organization state indicates that the LOB was not well inserted, the reorganization system 124 reorganizes the LOB. In Block 606, after reorganization, the reorganization system 124 saves the organization state of the LOB so that the LOB is not considered for reorganization again.

Since each LOB space map is scanned during LOB reorganization, there is no additional cost incurred by the reorganization system 124 to determine whether the LOB should be rechunked because the usage map information is in the LOB space map.

If the allocation of LOB pages for insert or update operations spans multiple LOB low-level space map pages, the reorganization system 124 does not set the organization state to indicate that a LOB is well inserted. Instead, during the next reorganization, the reorganization system 124 will process the LOB and potentially reorganize the LOB. At this time, the reorganization system 124 again considers whether to set the organization state for the LOB. However, if the reorganization system 124 recognizes that the LOB does not need to be rechunked, no LOB pages are removed. After reorganization, the organization state is saved, and the LOB is not considered for reorganization again.

In an alternative embodiment, the reorganization system 124 does not maintain the organization state for insert operations. This optimization avoids updating a LOB page twice.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of reorganizing a table space stored on a data storage device connected to a computer, the method comprising:

when inserting or updating data into a portion of the table space, setting a flag in a space map which is associated with the data to indicate whether the data was well inserted, wherein the space map is stored in the table space with the data; and when reorganizing the table space, when the flag indicates that data was well inserted, avoiding reorganization of the portion of the table space in which the data was well inserted.

2. The method of claim 1, wherein the method further comprises, when reorganizing the table space, when the flag indicates that the data was not well inserted, processing the data so that it is well inserted.

3. The method of claim 1, wherein the method further comprises, as data is being inserted, tracking how the data is being inserted.

4. The method of claim 3, wherein the method further comprises, after inserting the data, using information obtained from the tracking to determine whether the data was well inserted.

5. The method of claim 3, wherein the method further comprises, as data is being updated, tracking of how the data is being updated.

6. The method of claim 5, wherein the method further comprises, after updating the data, using information obtained from the tracking to determine whether the data was well inserted.

7. An apparatus for reorganizing a table space, comprising:

a computer having a data storage device connected thereto, wherein the data storage device stores the table space;

one or more computer programs, performed by the computer, for, when inserting or updating data into a portion of the table space, setting a flag in a space map which is associated with the data to indicate whether the data was well inserted, wherein the space map is stored in the table space with the data, and, when reorganizing the table space, when the flag indicates that data was well inserted, avoiding reorganization of the portion of the table space in which the data was well inserted.

8. The apparatus of claim 7, further comprising the means for, when reorganizing the table space, when the flag indicates that the data was not well inserted, processing the data so that it is well inserted.

9. The apparatus of claim 7, further comprising the means for, as data is being inserted, tracking how the data is being inserted.

10. The apparatus of claim 9, further comprising the means for, after inserting the data, using information obtained from the means for tracking to determine whether the data was well inserted.

11. The apparatus of claim 7, further comprising the means for, as data is being updated, tracking of how the data is being updated.

12. The apparatus of claim 11, further comprising the means for, after updating the data, using information obtained from the means for tracking to determine whether the data was well inserted.

13. An article of manufacture comprising a computer program carrier readable by a computer and embodying one or more instructions executable by the computer to perform a method for reorganizing a table space stored in a data storage device connected to the computer, the method comprising:

when inserting or updating data into a portion of the table space, setting a flag in a space map which is associated with the data to indicate whether the data was well inserted, wherein the space map is stored in the table space with the data; and when reorganizing the table space, when the flag indicates that data was well inserted, avoiding reorganization of the portion of the table space in which the data was well inserted.

14. The article of manufacture of claim 13, wherein the method further comprises, when reorganizing the table space, when the flag indicates that the data was not well inserted, processing the data so that it is well inserted.

15. The article of manufacture of claim 13, wherein the method further comprises, as data is being inserted, tracking how the data is being inserted.

16. The article of manufacture of claim 15, wherein the method further comprises, after inserting the data, using information obtained from the tracking to determine whether the data was well inserted.

17. The article of manufacture of claim 13, wherein the method further comprises, as data is being updated, tracking of how the data is being updated.

18. The article of manufacture of claim 17, wherein the method further comprises, after updating the data, using information obtained from the tracking to determine whether the data was well inserted.

19. The apparatus of claim 7, further comprising one or more computer programs that, when reorganizing the table space, when the flag indicates that the data was not well inserted, process the data so that it is well inserted.

20. The apparatus of claim 7, further comprising one or more computer programs that, as data is being inserted, track how the data is being inserted.

21. The apparatus of claim 20, further comprising one or more computer programs that, after inserting the data, use information obtained from the one or more computer programs that track to determine whether the data was well inserted.

22. The apparatus of claim 7, further comprising one or more computer programs that, as data is being updated, track of how the data is being updated.

23. The apparatus of claim 22, further comprising one or more computer programs that, after updating the data, use information obtained from one or more computer programs that track to determine whether the data was well inserted.

24. The method of claim 1, wherein the data is LOB data.

25. The apparatus of claim 7, wherein the data is LOB data.

26. The article of manufacture of claim 13, wherein the data is LOB data.

* * * * *